United States Patent
Mori

(10) Patent No.: US 8,237,955 B2
(45) Date of Patent: Aug. 7, 2012

(54) DECIDING PRIORITY IMAGE FORMING MEANS BASED ON SEARCH LOG INFORMATION

(75) Inventor: Hiroshi Mori, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1570 days.

(21) Appl. No.: 11/468,907

(22) Filed: Aug. 31, 2006

(65) Prior Publication Data

US 2007/0076247 A1 Apr. 5, 2007

(30) Foreign Application Priority Data

Sep. 2, 2005 (JP) ................................ 2005-255619

(51) Int. Cl.
*G06F 3/12* (2006.01)

(52) U.S. Cl. .......... 358/1.15; 358/1.1; 400/692; 399/79; 399/80

(58) Field of Classification Search ................ 358/1.15, 358/1.1; 400/692; 399/79–80
See application file for complete search history.

(56) References Cited

U.S. PATENT DOCUMENTS

| 6,341,907 | B1 * | 1/2002 | Katsuyoshi | 400/582 |
| 2004/0068507 | A1 * | 4/2004 | Inoue | 707/100 |
| 2005/0060649 | A1 * | 3/2005 | Kimura et al. | 715/526 |

FOREIGN PATENT DOCUMENTS

JP 2003-99219 4/2003

* cited by examiner

*Primary Examiner* — Benny Q Tieu
*Assistant Examiner* — Martin Mushambo
(74) *Attorney, Agent, or Firm* — Rossi, Kimms & McDowell LLP

(57) ABSTRACT

This invention makes it possible to provide an image forming apparatus capable of causing an information processing apparatus to install a driver desired by a user by selecting an appropriate PDL and presenting device information to the information processing apparatus, and increasing the convenience for the user, a control method for the apparatus, and a program. To accomplish this, image forming unit-specific log information associated with a plurality of image forming units of the image forming apparatus is stored in a storage device. On the basis of the log information, a priority image forming unit is decided from the plurality of image forming units. Identification information containing an identifier of the decided image forming unit is transmitted in response to an information request transmitted from the information processing apparatus.

5 Claims, 21 Drawing Sheets

FIG. 2

| TAG | VALUE |
|---|---|
| CLS | PRINTER |
| MFG | ABC |
| MDL | LBP-XXX PDL1 |
| CMD | PDL1, IEEE1284 |

FIG. 7

```
<Probe>
        <Types>PrintService</Types>          ~ 701
</Probe>
```

FIG. 9

```
<Metadata>
    <Service>
        <EndpointReference>
            <Address>http://192.168.0.1/print</Address>
        </EndpointReference>
        <Types>PrintService</Types>
        <ServiceId>1</ServiceId>  ～901
    </Service>
    <Service>
    ...
    </Service>
</Metadata>
```

FIG. 11

```
<Metadata>
    <PrinterMetadata>
        <PrinterName>Printer in Copy Room</PrinterName>
        <DeviceId>CLS:PRINTER;MFG:ABC;MDL:LBP-XXX PDL1;CMD:PDL1,IEEE1284</DeviceId>
    </PrinterMetadata>
</Metadata>
```

FIG. 12

| SERVICE ID | SERVICE |
|---|---|
| 1 | PrintService/PDL1 |
| 2 | PrintService/PDL2 |

FIG. 14

|  | PROCESSING LOG VALUE (NUMBER OF TIMES OF PROCESSING) |
|---|---|
| PDL1 | 2 |
| PDL2 | 10 |

FIG. 17

| HOST IP | PDL DESIGNATED IN SEARCH |
|---|---|
| 192.168.0.2 | PDL1 |
| 192.168.0.3 | PDL1 |

FIG. 20

|  | STORAGE LOG VALUE (NUMBER OF TIMES OF DATA STORAGE) |
|---|---|
| PDL1 | 2 |
| PDL2 | 10 |

DECIDING PRIORITY IMAGE FORMING MEANS BASED ON SEARCH LOG INFORMATION

BACKGROUND OF THE INVENTION

1. Field of the Invention

The present invention relates to an image forming apparatus which is connected to a network and is communicable with an information processing apparatus on the network, a control method therefor, a program, and an image forming system including the image forming apparatus and information processing apparatus.

2. Description of the Related Art

Conventionally, image forming apparatuses (e.g., printers and multifunction peripherals) that are connected to a network and receive an operation from a computer through the network are used. Some of the image forming apparatuses can extend PDLs (Page Description Languages) processible in the apparatus later to support a plurality of PDLs.

When a device serving as a peripheral device is connected to an information processing apparatus such as a host computer, the device can transmit device information containing the model name and manufacturer name to the information processing apparatus. Upon receiving the device information, the information processing apparatus can refer to the device ID in the device information and selectively install a device driver specified by the device ID. This technique is called "plug and play".

Printer driver installation processing by general plug and play will be described with reference to FIG. 1.

Referring to FIG. 1, a general personal computer (PC) or workstation is used as a host computer, i.e., an example of an information processing apparatus 100. Assume that a plurality of driver sets 101 to 103 are stored in the information processing apparatus 100 in advance as drivers packaged in the operating system (OS) of the apparatus.

Each of the driver sets 101 to 103 includes an INF file 104 that describes unique information to be referred to in installing the driver, various kinds of execution modules 105, and resources 106. A device ID is described in the INF file 104. The device ID is formed from the value of an MFG tag as a manufacturer name and the value of an MDL tag as a product name in device information received upon plug and play.

The device ID is used as an identifier to make an image forming apparatus (printer) accurately correspond to a device driver at the time of installation. When the information processing apparatus 100 is connected to an image forming apparatus 107 through a communication medium 108 such as USB, the image forming apparatus 107 detects the connection. After detecting the connection, the image forming apparatus 107 transmits, to the information processing apparatus 100 through the communication medium 108, device information 109 defined by IEEE1284 and containing unique information of the image forming apparatus 107. The device information 109 defined by IEEE1284 contains pieces of information shown in FIG. 2.

Upon receiving the device information 109, the OS in the information processing apparatus 100 reads out the CLS tag from the device information 109, detects that the target of plug and play is the image forming apparatus 107, and starts installing a corresponding driver set. The OS generates a device ID including the MFG tag and MDL tag in the device information 109 and searches for a driver set with the INF file 104 containing the device ID from the driver sets 101 to 103.

When the driver set corresponding to the device information 109 is found, the various kinds of execution modules 105 and resources 106 in the driver set are installed in the OS. The installed driver set is connected to a port of the communication medium 108 that has received the device information 109. If no corresponding driver set is present in the information processing apparatus 100, the processing is ended without installation.

The device information shown in FIG. 2 will be described.

The format of the device information shown in FIG. 2 includes a "tag" column representing tag names and a "value" column representing possible tag values. A CLS tag stores "PRINTER" as its value. The CLS tag stores the apparatus type as its value. In this case, this tag indicates that the connected peripheral device is an image forming apparatus.

An MFG tag stores "ABC" as its value. The MFG tag indicates the manufacturer name. That is, it indicates that ABC is the manufacturer. An MDL tag stores "LBP-XXX PDL1" as its value. The MDL tag indicates the model name and PDL type. In this case, this tag indicates that the model of the peripheral device is LBP-XXX, and the PDL type is PDL1.

A CMD tag stores "PDL1, IEEE1284" as its value. The value of the CMD tag includes the command and PDL name to be transmitted/received through the communication medium. In this case, this tag indicates that the peripheral device would transmit/receive a command group PDL1 as the PDL type by using IEEE1284 as the communication medium type.

In the information processing apparatus 100 that has received the device information 109 shown in FIG. 2, the OS generates a device ID "ABC LBP-XXX PDL1" for the values of the MFG and MDL tags. A driver set is searched by using the device ID as a key.

Plug-and-play techniques using a local interface such as USB or a network interface such as LAN are also proposed. Examples are SOAP (Simple Object Access Protocol)-based Web service protocols called WS-Discovery and WS-MetadataExchange.

The information processing apparatus can detect the presence of a device on the network and acquire device information from the detected device by using these techniques. Hence, the driver of the device on the network can be installed by the same plug and play as in the local interface.

A technique of causing a printer to notify an information processing apparatus of a device ID by designating a predetermined mode to install a driver corresponding to the device ID by the information processing apparatus has also been proposed (Japanese Patent Laid-Open No. 2003-99219).

However, the above-described conventional techniques install a plurality of drivers even on an information processing apparatus when an image forming apparatus has a plurality of PDLs. In most cases, although a general user uses a PDL with little concern for its type in printing, the information processing apparatus installs a plurality of drivers. This may confuse the user.

Even in a specific PDL use environment under which it is apparent from the processing log that a PDL is kept unchanged, the information processing apparatus may not install a driver corresponding to that PDL.

SUMMARY OF THE INVENTION

The present invention has been made to solve the above problems, and has as its object to provide an image forming apparatus capable of causing an information processing apparatus to install a driver desired by a user by selecting an appropriate PDL and presenting device information to the information processing apparatus, and increasing the convenience for the user, a control method of the apparatus, and a program.

According to the present invention, the foregoing object is attained by providing an image forming apparatus which is connected to a network and can communicate with an information processing apparatus on the network, comprising:

a plurality of image forming means;

storage means for storing log information associated with the plurality of image forming means;

decision means for deciding priority image forming means from the plurality of image forming means on the basis of the log information; and transmission means for transmitting identification information containing an identifier of the priority image forming means decided by the decision means in response to an information request transmitted from the information processing apparatus.

In a preferred embodiment, the storage means stores, as the log information, use log information of image forming means used in printing a print job transmitted from the information processing apparatus, and the decision means refers to the use log information and decides, as the priority image forming means from the plurality of image forming means, image forming means having a largest number of times of use.

In a preferred embodiment, the apparatus further comprises:

designation means for designating whether to cause the decision means to make a decision, and, if the designation means designates the decision means to make no decision, designating the priority image forming means from the plurality of image forming means, wherein the decision means decides, as the priority image forming means from the plurality of image forming means, image forming means designated by the designation means.

In a preferred embodiment, the apparatus further comprises:

reception means for receiving a search request from the information processing apparatus; and response means for interpreting a type designated by the search request and making a response only when the image forming apparatus includes the type.

In a preferred embodiment, if the type designated by the search request indicates the type of the image forming means, the storage means stores, as the log information, search log information representing an information processing apparatus which has transmitted the search request, and if the information processing apparatus which has transmitted the information request exists in the search log information, the decision means decides, as the priority image forming means from the plurality of image forming means, image forming means with the type corresponding to the information processing apparatus.

In a preferred embodiment, the storage means stores, as the log information, use log information of image forming means used in printing a print job transmitted from the information processing apparatus, and, if the type designated by the search request indicates the type of the image forming means, further stores, as the log information, search log information representing an information processing apparatus which has transmitted the search request, if an information processing apparatus which has transmitted the search request exists in the search log information, the decision means decides, as the priority image forming means from the plurality of image forming means, image forming means with a type corresponding to the information processing apparatus, and if no information processing apparatus which has transmitted the information request exists in the search log information, the decision means refers to the use log information and decides, as the priority image forming means from the plurality of image forming means, image forming apparatus having a largest number of times of use.

In a preferred embodiment, the apparatus further comprises:

storage means for storing, in a storage device, a print job transmitted from the information processing apparatus, wherein the storage means stores, as the log information, storage log information of the print job stored by the storage means in accordance with a storage instruction of the print job, and the decision means refers to the storage log information and decides, as the priority image forming means from the plurality of image forming means, image forming means to be used for a print job having a largest number of times of storage.

In a preferred embodiment, the apparatus further comprises:

storage means for storing, in a storage device, a print job transmitted from the information processing apparatus, wherein the storage means stores, as the log information, use log information of image forming means used in printing a print job transmitted from the information processing apparatus, and further stores, as the log information, storage log information of the print job stored by the storage means in accordance with a storage instruction of the print job, and if at least two image forming means having a largest number of times of use exist in the use log information, the decision means refers to the use log information for the at least two image forming means, and decides, as the priority image forming means from the plurality of image forming means, image forming means to be used for a print job having a largest number of times of storage.

In a preferred embodiment, the apparatus further comprises:

an external device which stores, as the log information, storage log information of a print job stored in a storage device of the external device in accordance with a storage instruction of the print job, wherein the decision means refers to, through the network, the storage log information stored by the external device, and decides, as the priority image forming means from the plurality of image forming means, image forming means to be used for a print job having a largest number of times of storage.

According to the present invention, the foregoing object is attained by providing an image forming system formed by connecting an image forming apparatus to an information processing apparatus through a network, wherein the image forming apparatus comprises a plurality of image forming means, storage means for storing log information associated with the plurality of image forming means, decision means for deciding priority image forming means from the plurality of image forming means on the basis of the log information, and transmission means for transmitting identification information containing an identifier of the priority image forming means decided by the decision means in response to an information request transmitted from the information processing apparatus; and the information processing apparatus comprises reception means for receiving the identification information from the image forming apparatus, and installation means for installing, on the basis of the identification information received by the reception means, a device driver to use the image forming apparatus.

According to the present invention, the foregoing object is attained by providing a control method for an image forming apparatus which is connected to a network and can communicate with an information processing apparatus on the network, comprising:

a storing step of storing, in a storage medium, log information associated with a plurality of image forming means of the image forming apparatus;

a decision step of deciding priority image forming means from the plurality of image forming means on the basis of the log information; and a transmission step of transmitting identification information containing an identifier of the priority image forming means decided in the decision step in response to an information request transmitted from the information processing apparatus.

According to the present invention, the foregoing object is attained by providing a program stored in a computer-readable memory, which causes a computer to execute control of an image forming apparatus which is connected to a network and can communicate with an information processing apparatus on the network, causing the computer to execute:

a storing step of storing, in a storage medium, log information associated with a plurality of image forming means of the image forming apparatus;

a decision step of deciding priority image forming means from the plurality of image forming means on the basis of the log information; and a transmission step of transmitting identification information containing an identifier of the priority image forming means decided in the decision step in response to an information request transmitted from the information processing apparatus.

Further features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a view for explaining device information defined by IEEE1284;

FIG. 7 is a view showing an example of a device search request according to the first embodiment of the present invention;

FIG. 9 is a view showing an example of device information according to the first embodiment of the present invention;

FIG. 11 is a view showing an example of service information according to the first embodiment of the present invention;

FIG. 12 is a view showing an example of service name information according to the first embodiment of the present invention;

FIG. 14 is a view showing an example of a PDL processing log list according to the first embodiment of the present invention;

FIG. 17 is a view showing an example of search log information according to the second embodiment of the present invention;

FIG. 20 is a view showing an example of a storage log list according to the third embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically started otherwise.

First Embodiment

Figure 1:
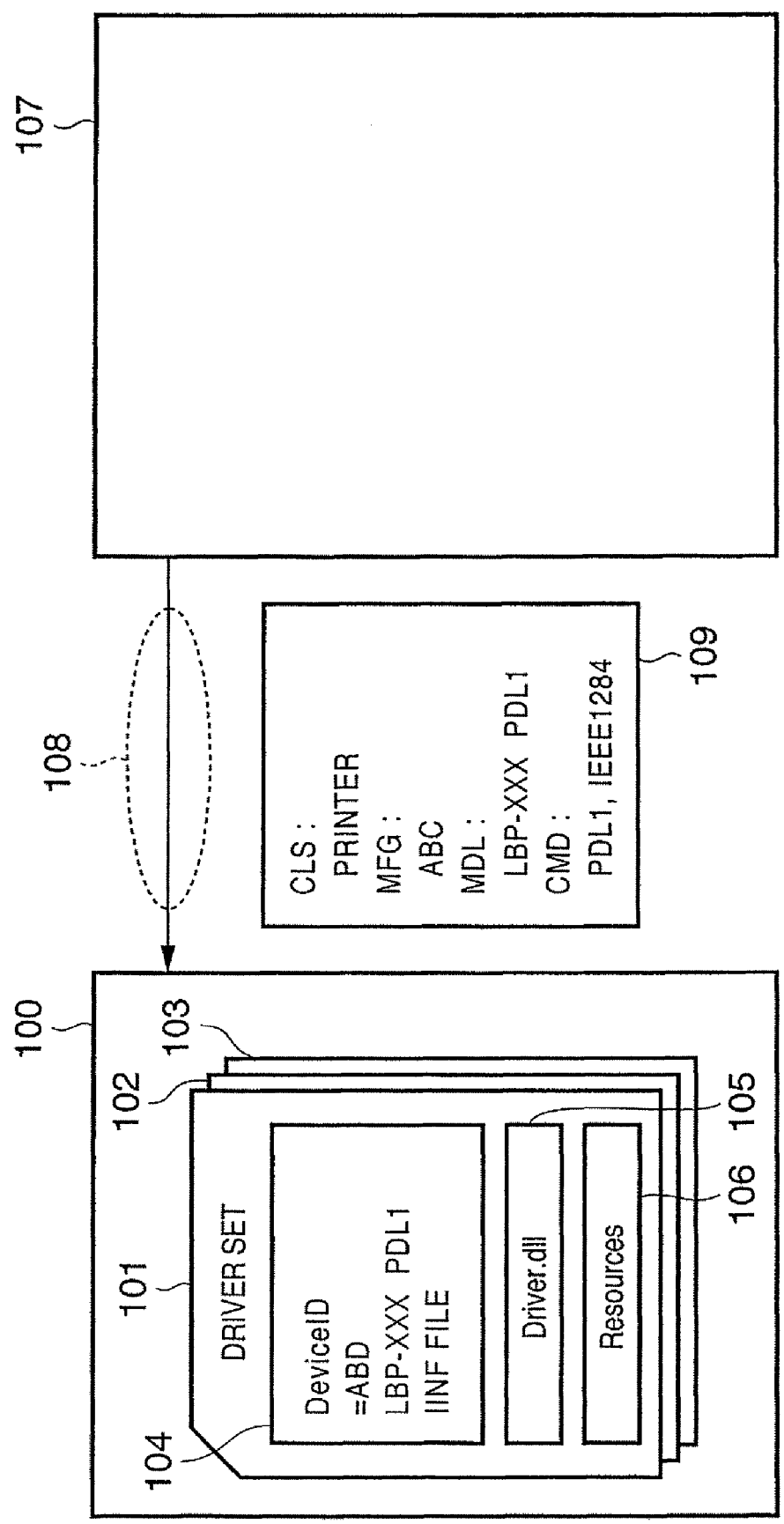
FIG. 1 is a view for explaining printer driver installation processing using plug and play.
Figure 3:
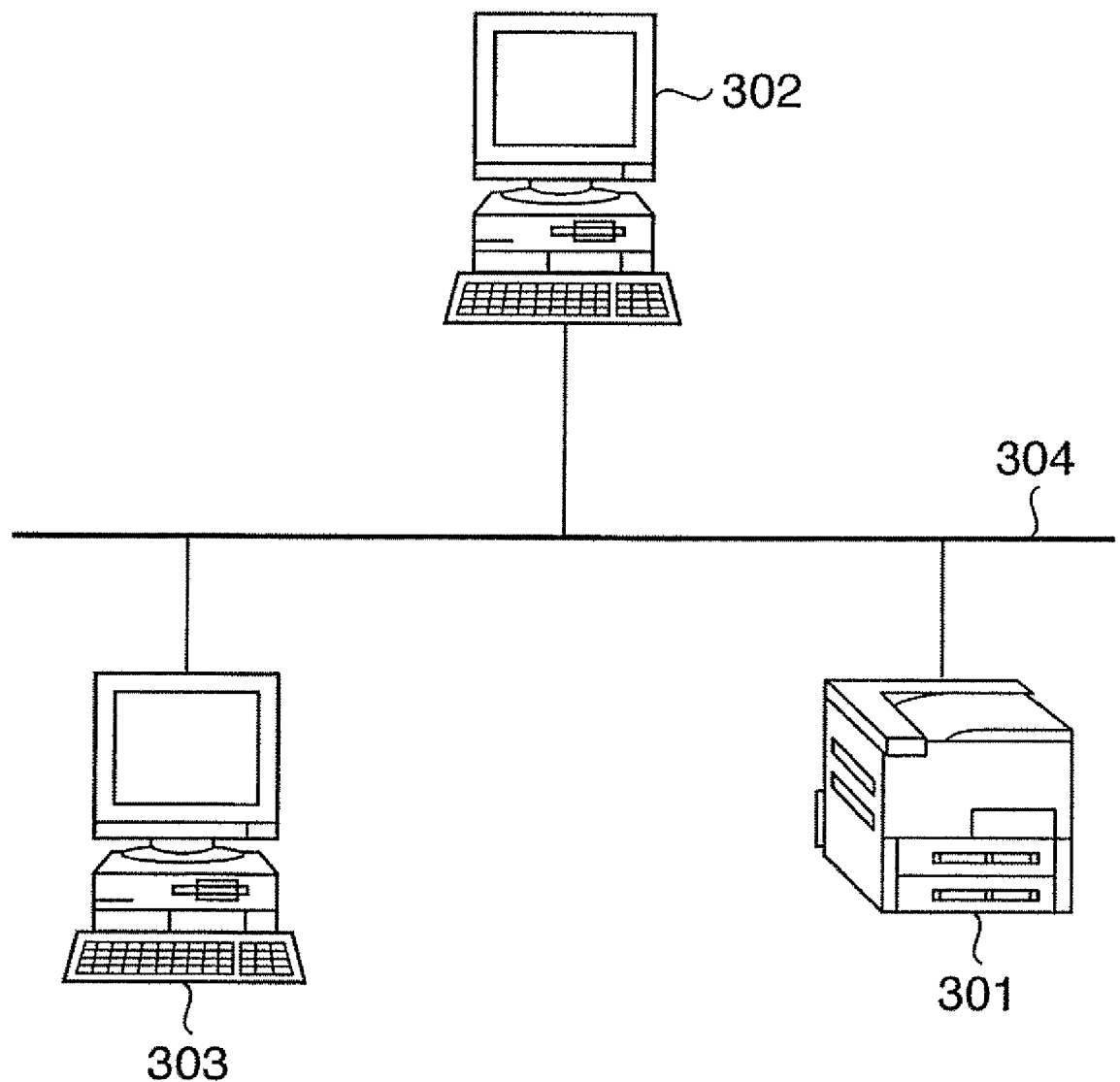
FIG. 3 is a view showing a configuration example of an image forming system according to the first embodiment of the present invention.

FIG. 3 is a view showing a configuration example of an image forming system according to the first embodiment of the present invention.

In the image forming system shown in FIG. 3, a device 301 and host computers 302 and 303 are connected to each other through a network 304.

The network 304 is a so-called communication network that is typically implemented by one of the Internet, LAN, WAN, telephone line, dedicated digital line, ATM, frame relay line, communication satellite channel, cable TV line, and data broadcast channel or a combination thereof. The network 304 only needs to transmit/receive data.

The hardware configuration of the device 301 will be described next with reference to FIG. 4.

Figure 4:
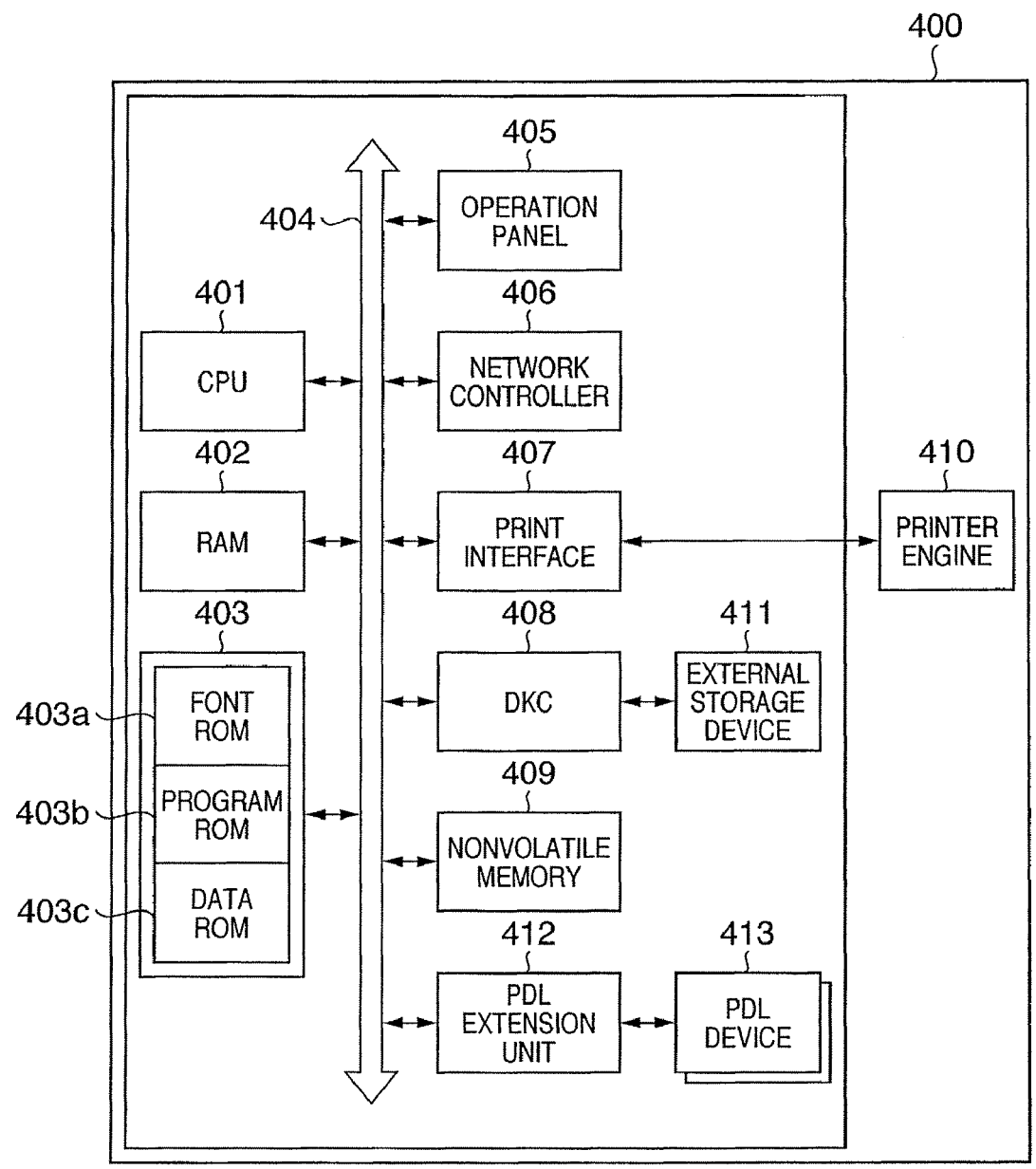
FIG. 4 is a block diagram showing the hardware configuration of a device according to the first embodiment of the present invention.

FIG. 4 is a block diagram showing the hardware configuration of the device according to the first embodiment of the present invention.

As the device, a laser beam printer 400 serving as an image forming apparatus will be exemplified here.

In the printer 400 shown in FIG. 4, a CPU 401 collectively controls access to various devices connected to a system bus

404 on the basis of a control program stored in a program ROM 403*b* of a ROM 403. The CPU 401 outputs an image signal as output information to a print unit (printer engine) 410 connected through a print interface 407.

The control program stored in the program ROM 403*b* includes programs to implement various flowcharts to be described later. The CPU 401 executes various processing operations shown in the flowcharts by executing the programs. The control program stored in the program ROM 403*b* also includes a program to convert an input PDL (Page Description Language) to bitmap data printable by the printer engine 410. When the program is executed by the CPU 401, the printer 400 functions as an image forming means.

The program ROM 403*b* of the ROM 403 stores control programs executable by the CPU 401. A font ROM 403*a* of the ROM 403 stores font data (including outline font data) to be used to generate output information. A data ROM 403*c* of the ROM 403 stores data to be used on the host computer (e.g., host computer 302).

The CPU 401 can execute communication processing with the host computer on the network 304 through a network controller 406. A RAM 402 mainly functions as the main memory or work area of the CPU 401. The RAM 402 is designed to extend the memory capacity by using an optional RAM connected to an extension port (not shown). The RAM 402 is used as an output information rasterization area or environment data storage area.

Access to an external storage device 411 such as a hard disk (HD) or IC card is controlled by a disk controller (DKC) 408. The external storage device 411 is used as a job storage area to store font data, an emulation program, and form data, temporarily spool a print job, and control the spooled job from the outside.

An operation panel 405 includes, e.g., a touch panel, and various keys and buttons so that the user can input various kinds of information from software keys displayed on the touch panel. A nonvolatile memory 409 stores various kinds of information such as printer mode setting information input from the operation panel 405.

Various extension units such as a finisher to execute stapling and sorting and a double-sided printing unit to implement double-sided printing can be attached to the printer 400 as options. The operations of the units are controlled from the CPU 401.

A PDL extension unit 412 connects at least one PDL device (PDL board) 413 which can be controlled from the CPU 401. The PDL device 413 serves as an image forming unit (image forming means) having a function of interpreting print data (PDL) received from the host computer and converting the data into bitmap data printable by the printer engine 410. At least one PDL device 413 is normally connected. More PDL devices 413 can be added later. Device information defined by IEEE1284 used in plug and play is held by the PDL device 413.

In the first embodiment to be described below, the device is assumed to have PDL1 and PDL2 as the standard PDL devices unless otherwise specified. A PDL of another type such as PDL3 can be added and extended as an optional PDL device.

Extension of the PDL device may be done by physically adding an extension board with a dedicated PDL device to the printer 400. If the PDL device is implemented by a program, a corresponding program may be added to the program ROM 403*b*. A PDL device may be added by storing programs corresponding to a plurality of kinds of PDL devices in the program ROM 403*b* in advance and validating a necessary PDL device by using a license key input by user operation.

Examples of the PDL are LIPS, PostScript, and PCL.

The detailed arrangement of the host computer 302 or 303 will be described next with reference to FIG. 5.

Figure 5:
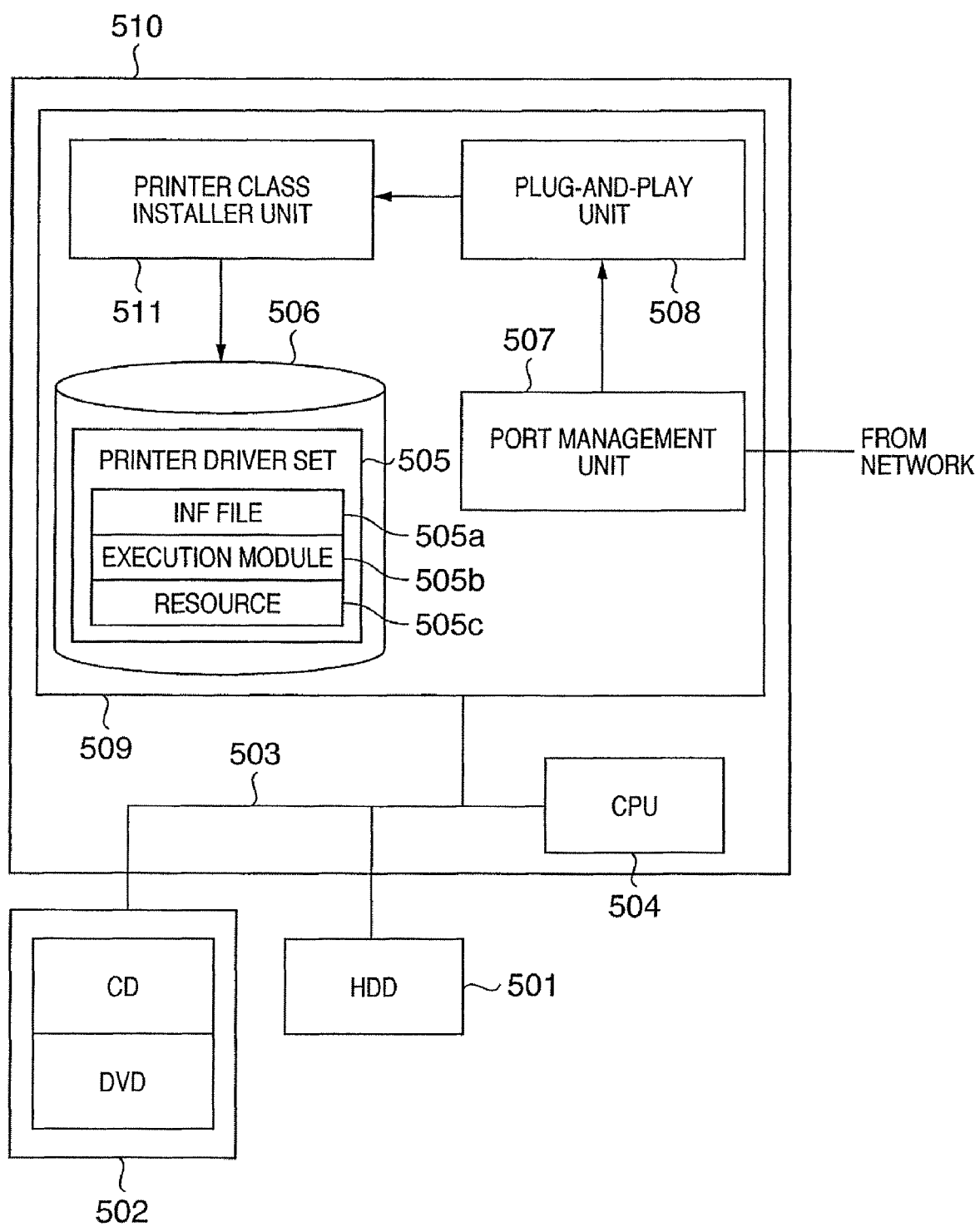
FIG. 5 is a block diagram showing the detailed arrangement of a host computer according to the first embodiment of the present invention.

FIG. 5 is a block diagram showing the detailed arrangement of the host computer according to the first embodiment of the present invention.

In an information processing apparatus 510 corresponding to each of the host computers 302 and 303, an HDD 501 is a hard disk drive with a large capacity. The HDD 501 can store in advance a program module to be loaded to a RAM 509 and a driver set 505 including an INF file. An external storage device 502 including a CD/DVD-ROM/RAM drive also has the same function.

A program module group implemented on the RAM 509 includes a port management unit 507, plug-and-play unit 508, printer class installer unit 511, and at least one printer driver set 505 managed on a driver library 506. The RAM 509 reads out the program modules from the HDD 501 and executes them as needed.

A CPU 504 collectively controls the printer class installer unit 511, plug-and-play unit 508, port management unit 507, and driver library 506, reads out each processing from the HDD 501 to the RAM 509, and executes the processing.

A BUS 503 connects the various constituent elements (CPU 504, RAM 509, HDD 501, and external storage device 502) of the information processing apparatus 510 to each other.

The port management unit 507 controls the interface on the side of the information processing apparatus 510 connected to the network 304 for communication with the device 400. In automatically installing a printer driver, the port management unit 507 receives device information defined by IEEE1284 and transfers it to the plug-and-play unit 508.

The plug-and-play unit 508 is a module to execute information control with a device for plug and play. The plug-and-play unit 508 generates a device ID from the values of MFG and MDL tags in the device information received from the port management unit 507. The plug-and-play unit 508 then transfers the generated device ID to the printer class installer unit 511.

The printer class installer unit 511 is a module to install a printer driver. On the basis of the device ID received from the plug-and-play unit 508, the printer class installer unit 511 searches for a printer driver set corresponding to the device ID from at least one printer driver set 505. When the printer driver set is found, the printer driver is installed and assigned to a necessary port.

The printer driver set 505 includes an execution module group 505*b* such as a DLL, a resource 505*c*, and an INF file 505*a* that describes their features for installation in correspondence with a printer driver.

The sequence of printer driver installation implemented between the information processing apparatus (host computer) 510 and the device (printer) 400 will be described next with reference to FIG. 6.

Figure 6:
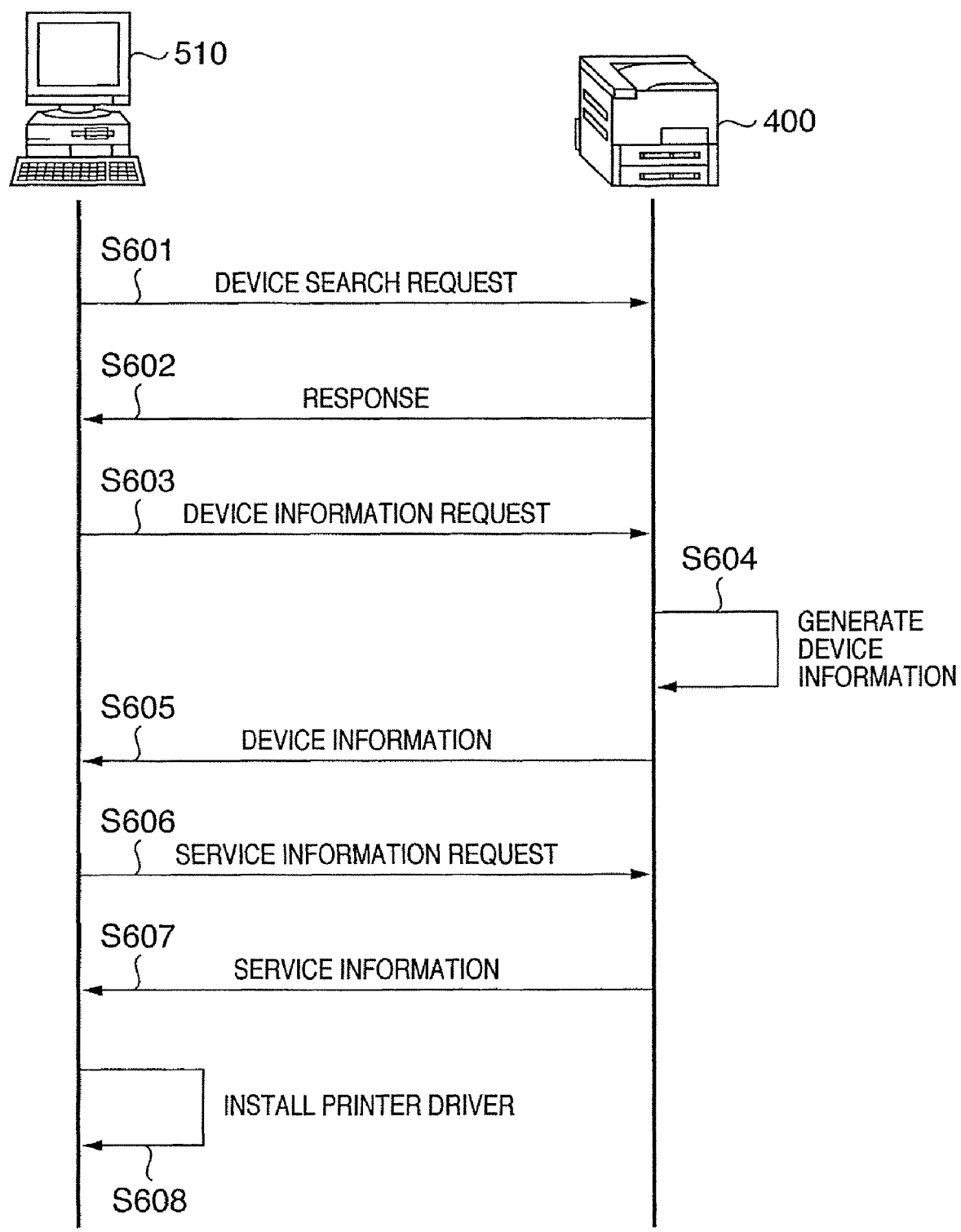
FIG. 6 is a sequence chart of printer driver installation according to the first embodiment of the present invention.

FIG. 6 is a sequence chart of printer driver installation according to the first embodiment of the present invention.

Figure 7:
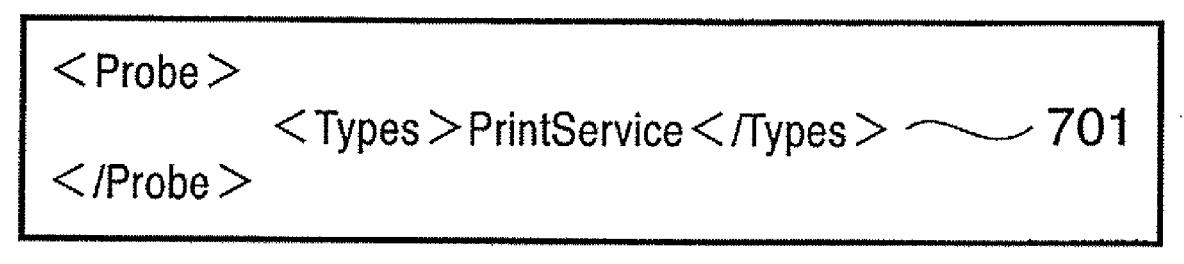

In step S601, the information processing apparatus 510 transmits a device search request to the network. The device search request is information described by, e.g., an XML format shown in FIG. 7 and is transmitted using multicast. A <Types> element 701 in FIG. 7 describes the type of device as the search target. For example, the type of function such as a print service or scan service or the type of PDL device such as a print service with PDL1 can be described.

All devices existing in the multicast reachable range receive the device search request. Each device determines in accordance with the flowchart in FIG. 8 to be described later whether the device responds to this request.

For example, if the device 400 determines that the device 400 responds, the device 400 transmits a response to the device search request to the information processing apparatus 510 in step S602. In step S603, the information processing apparatus 510 transmits a device information request to the found device (the device that has transmitted the response). If the device 400 should notify that it has participated in the network, the device 400 transmits the network participation notification to the information processing apparatus 510 instead of the processing in steps S601 and S602. In step S603, the information processing apparatus 510 transmits a device information request to the device on the basis of the network participation notification from the device 400.

Upon receiving the device information request, the device 400 generates device information by a method (to be described later) in step S604. In step S605, the generated device information is transmitted to the information processing apparatus 510.

The device information (identification information) is described in, e.g., an XML format shown in FIG. 9 and contains a list of services provided by the device. The value of a <ServiceID> element 901 in FIG. 9 indicates a unique ID (service ID), i.e., an identifier to identify each service and is used to specify a necessary service later.

In the first embodiment, the RAM 402 stores and manages, as a PDL processing log list, processing log information of the PDL type, the number of times of processing, and the like which has undergone processing by the device. In generating device information, the device selects an optimal PDL device on the basis of the contents of the PDL processing log list stored in the RAM 402. The device generates device information containing a service list of only print services corresponding to the selected PDL device.

As described above, according to the first embodiment, an image forming apparatus has a function of selecting, on the basis of a PDL processing list, a PDL device (priority PDL device) to be preferentially used by the information processing apparatus 510. This function will be referred to as automatic PDL selection processing hereinafter. The automatic PDL selection processing is valid in the initial (default) state. The device 400 generates device information for the information processing apparatus by the automatic PDL selection processing. However, device information generation is not limited to this.

Figure 10:
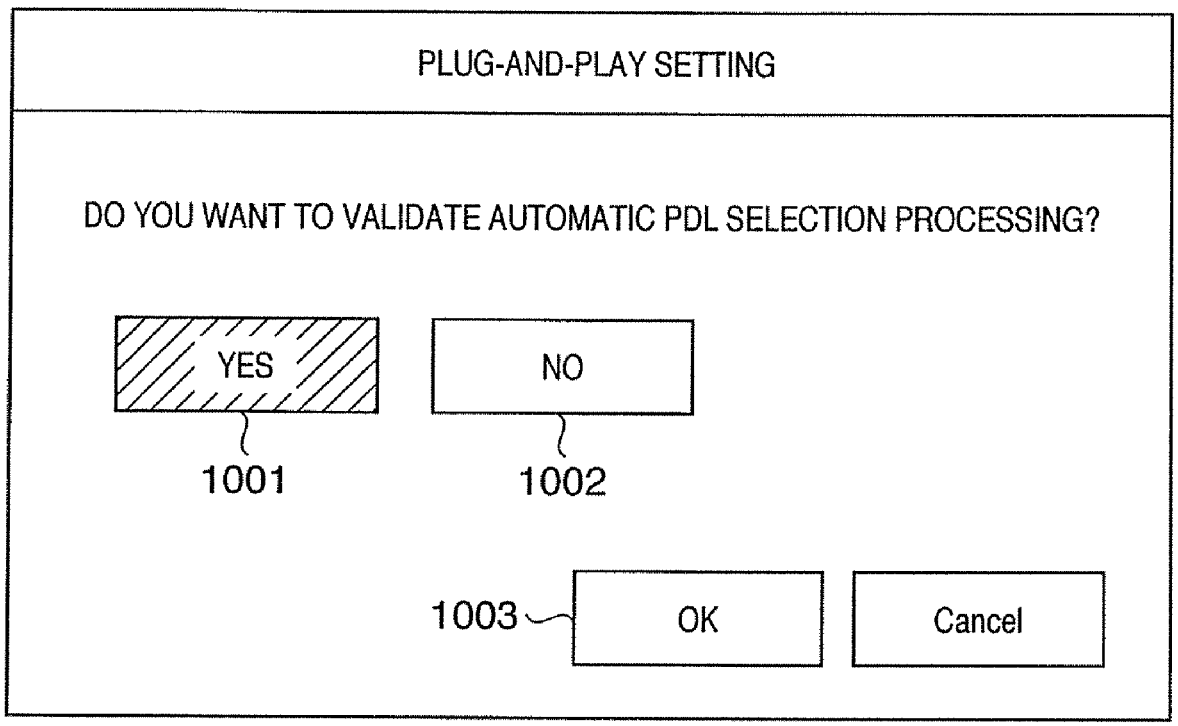
FIG. 10 is a view showing an example of a plug-and-play setting window on an operation panel according to the first embodiment of the present invention.

For example, the validity of the automatic PDL selection processing can be set using a plug-and-play setting window displayed on the operation panel 405 of the device 400 as shown in FIG. 10. Especially, if the automatic PDL selection processing is not used, print services of all the PDL devices of the device may be listed to select, as a priority PDL device, a PDL device corresponding to an arbitrary print service desired by the user.

In the example of FIG. 10, a "YES" button 1001 to validate the automatic PDL selection processing is selected as the initial state. On the other hand, when the user selects a "NO" button 1002 and operates an "OK" button 1003, print services of all the PDL devices of the device are displayed to allow the user to select a desired print service from the choices.

In step S606, the information processing apparatus 510 designates a necessary service ID from the received device information and transmits a service information request. Upon receiving the service information request, the device 400 acquires the value of device information from a PDL device corresponding to the designated service ID and transmits service information containing the value to the information processing apparatus 510 in step S607. The service information is described in, e.g., an XML format shown in FIG. 11.

In step S608, the information processing apparatus 510 refers to the service information received from the device 400 and installs a corresponding printer driver. If the device 400 transmits device information containing a plurality of service lists to the information processing apparatus 510 in step S605, steps S606 to S608 are repeated. Printer drivers equal in number to the listed services are installed.

Determination processing of determining whether the device 400 that has received the device search request responds to this request in the sequence shown in FIG. 6 will be described next with reference to FIG. 8.

Figure 8:
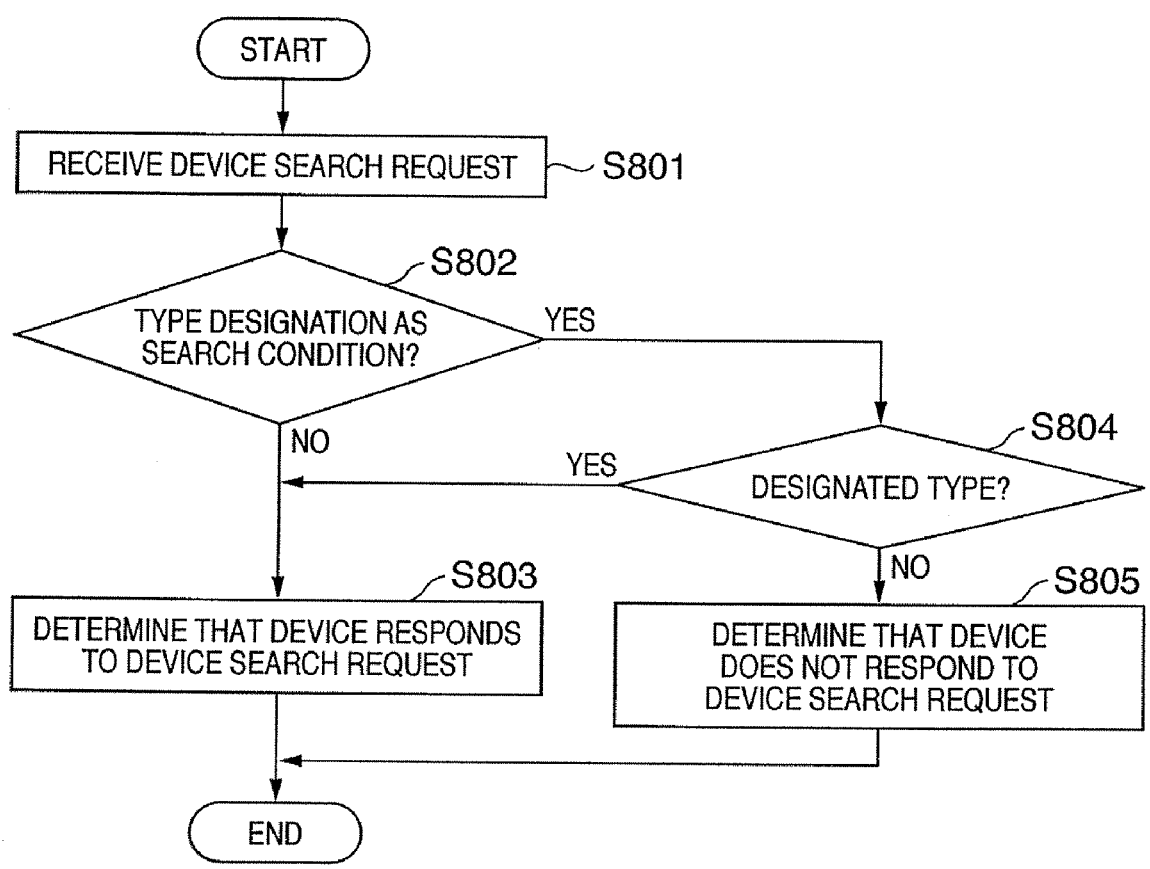
FIG. 8 is a flowchart showing determination processing according to the first embodiment of the present invention.

FIG. 8 is a flowchart showing determination processing according to the first embodiment of the present invention.

In step S801, the device 400 receives a device search request. In step S802, the presence/absence of type designation by a <Types> tag in the device search request is determined as the search condition. If no type is designated (NO in step S802), the received device search request indicates exhaustive device search. The process advances to step S803 to determine that the device 400 responds to the device search request.

If a type is designated (YES in step S802), the process advances to step S804 to determine whether the designated type is included in the type of the device itself. If the designated type is included in the type of the device itself (YES in step S804), the process advances to step S803. If the designated type is not included in the type of the device itself (NO in step S804), the process advances to step S805 to determine that the device 400 does not respond to the device search request.

The type of the device itself used for determination in step S804 indicates the PDL device attached to the device 400 and service name information of the service of the PDL device, as shown in FIG. 12. The device 400 detects a PDL device attached to itself, generates service name information on the basis of the detection result, and holds the generated information in the RAM 402, as needed. In this case, as shown in FIG. 12, the device manages each PDL device as one Print-Service and assigns a service ID to each service in the service list information.

Print processing executed by the device will be described next with reference to FIG. 13.

Figure 13:
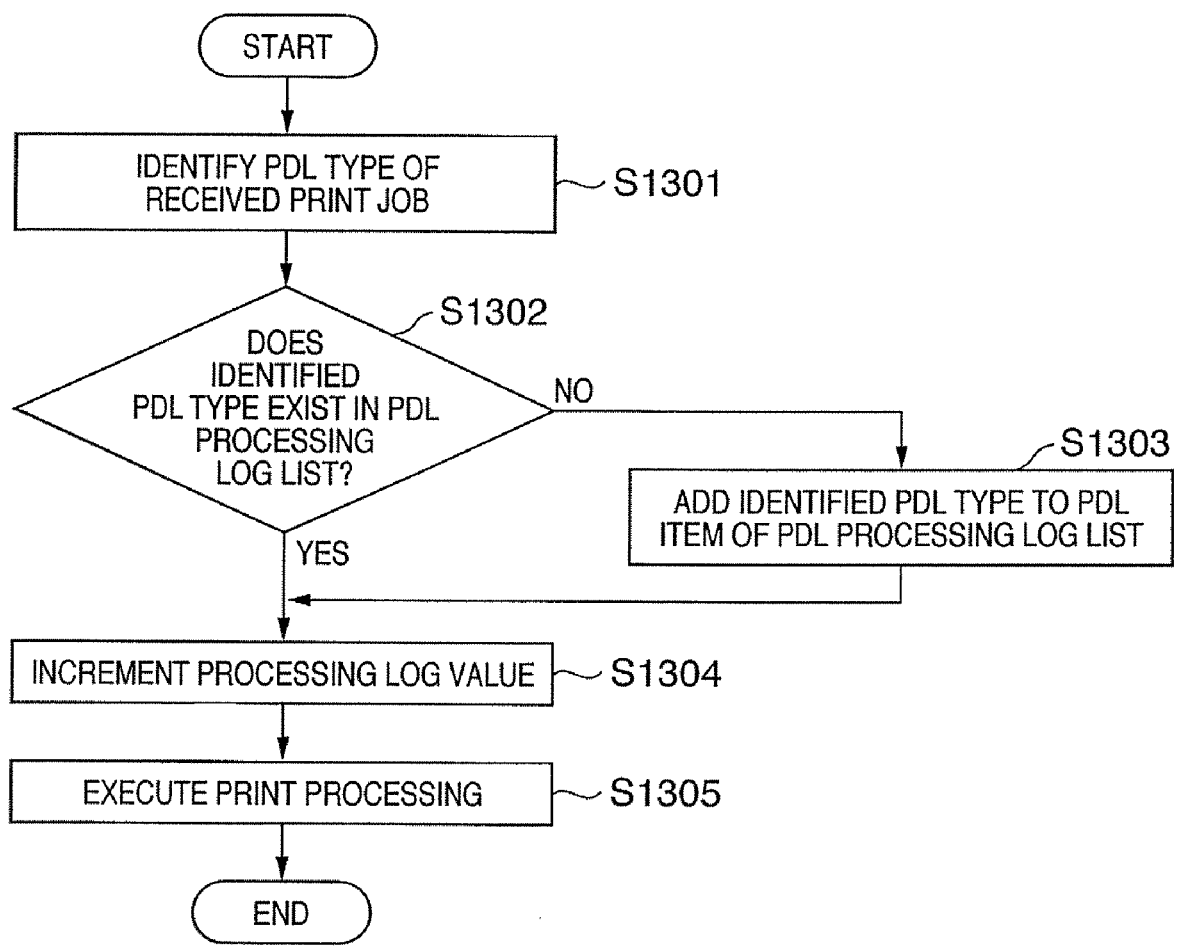
FIG. 13 is flowchart showing print processing according to the first embodiment of the present invention.

FIG. 13 is a flowchart showing print processing according to the first embodiment of the present invention.

In the first embodiment, the device generates/updates the above-described PDL processing log list in the print processing shown in FIG. 13. The PDL processing log list has, e.g., the arrangement shown in FIG. 14 to manage PDL device (PDL item)—specific processing log values each representing the number of times of processing by the corresponding PDL device of the device 400.

In step S1301, the device 400 identifies the PDL type (format) of a print job for which the device 400 has received a print instruction. The print job includes print setting information such as the PDL type, paper size, paper orientation, paper type, and print quality. The device 400 can identify the PDL type (format) of that print job from the print setting information.

It is determined in step S1302 whether the identified PDL type exists in the PDL processing log list. If no identified PDL type exists (NO in step S1302), the process advances to step S1303 to add the identified PDL type to the PDL item of the PDL processing log list.

If the identified PDL type exists (YES in step S1302), the process advances to step S1304 to increment the PDL processing log value (number of times of processing) corresponding to the identified PDL type in the PDL processing log list. This makes it possible to manage the processing log value (number of times of processing) of the PDL device used for the print processing by the device 400. In step S1305, the device prints the received print job.

Generation processing of causing the device to generate a service list contained in device information in step S604 of the sequence shown in FIG. 6 will be described next with reference to FIG. 15.

Figure 15:
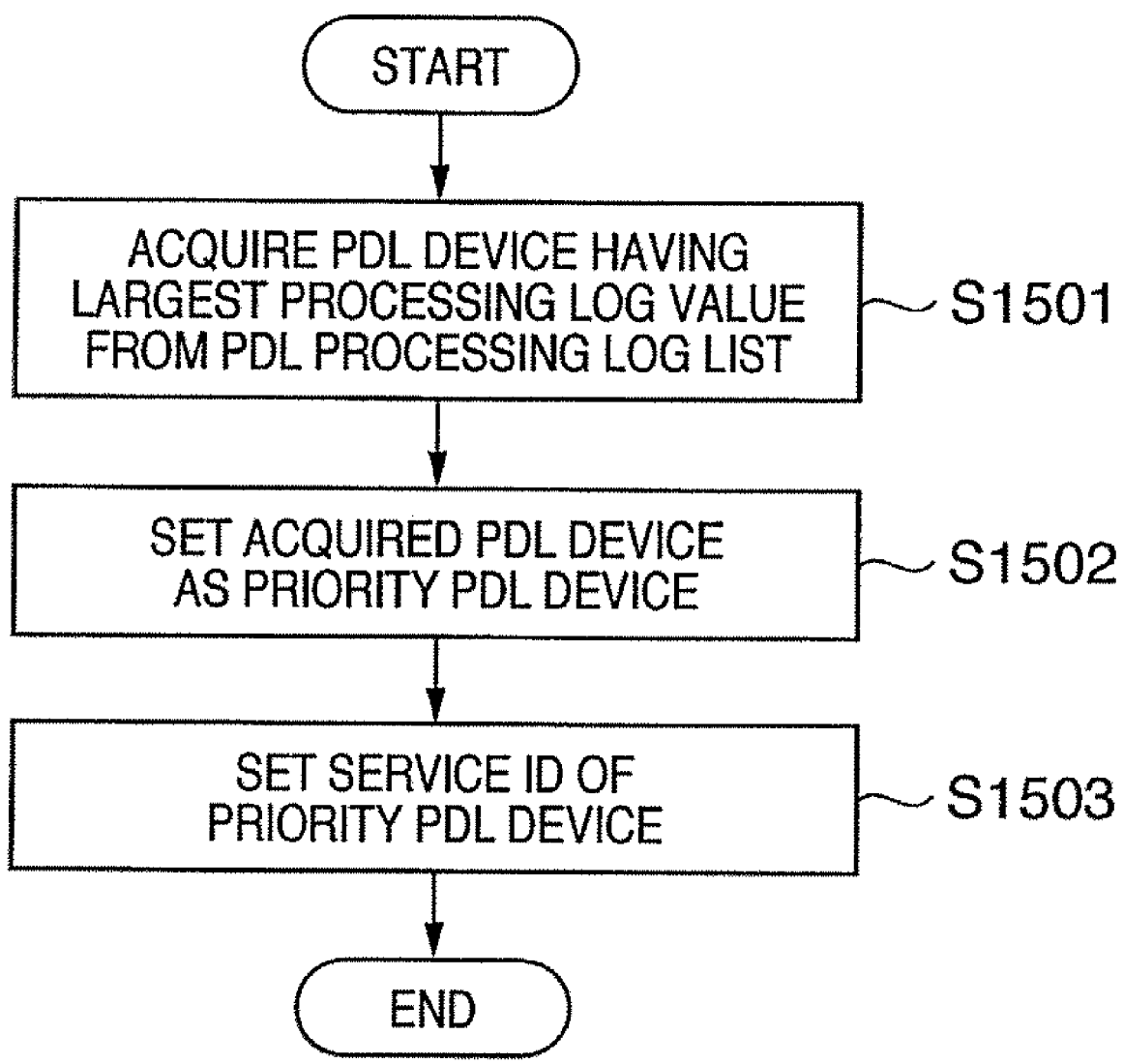
FIG. 15 is a flowchart showing generation processing according to the first embodiment of the present invention.

FIG. 15 is a flowchart showing generation processing according to the first embodiment of the present invention.

In step S1501, the device acquires a PDL device having the largest processing log value (number of times of processing) from the PDL processing log list (FIG. 14).

If a plurality of PDL devices having the largest processing log value exist, for example, the device may set the priority order of the PDL devices in advance to acquire one of them on the basis of the priority order. Alternatively, the device may acquire all the PDL devices.

In step S1502, the device sets the acquired PDL device as a priority PDL device. In step S1503, the device acquires the service ID corresponding to the set priority PDL from the service name information shown in FIG. 12 to set it as the value of <ServiceID>.

As described above, according to the first embodiment, an image forming apparatus manages processing log information of PDL devices used for its internal processing. On the basis of the processing log information, the image forming apparatus automatically selects a suitable PDL device to be preferentially used, and notifies an information processing apparatus of device information representing the selection result.

Especially, in the first embodiment, an image forming apparatus automatically selects, on the basis of processing log information, a PDL device having the largest number of times of use, and notifies an information processing apparatus of device information representing the selection result. Hence, the information processing apparatus can install a printer driver corresponding to a PDL device that is most frequently used (expected to be desired by a user at a high probability), thus increasing the convenience for the user.

Second Embodiment

In the second embodiment, when a device search request designates the type of one of PDL devices in the sequence shown in FIG. 6, an image forming apparatus stores host information (identification information) representing a source information processing apparatus. Upon receiving a device information request, the image forming apparatus compares host information in the request with the host information stored in the apparatus and sets a priority PDL device on the basis of the comparison result. This arrangement will be described.

Especially, according to the arrangement of the second embodiment, for an information processing apparatus 510 that has designated and searched for a specific PDL device, the specific PDL device can be set as a priority PDL device. In other words, an information processing apparatus 510 can install a printer driver corresponding to a PDL device designated in device search, irrespective of a priority PDL device set by a device 400.

Determination processing of determining whether the device 400 that has received a device search request responds to this request in the sequence shown in FIG. 6 according to the arrangement of the second embodiment will be described next with reference to FIG. 16.

Figure 16:
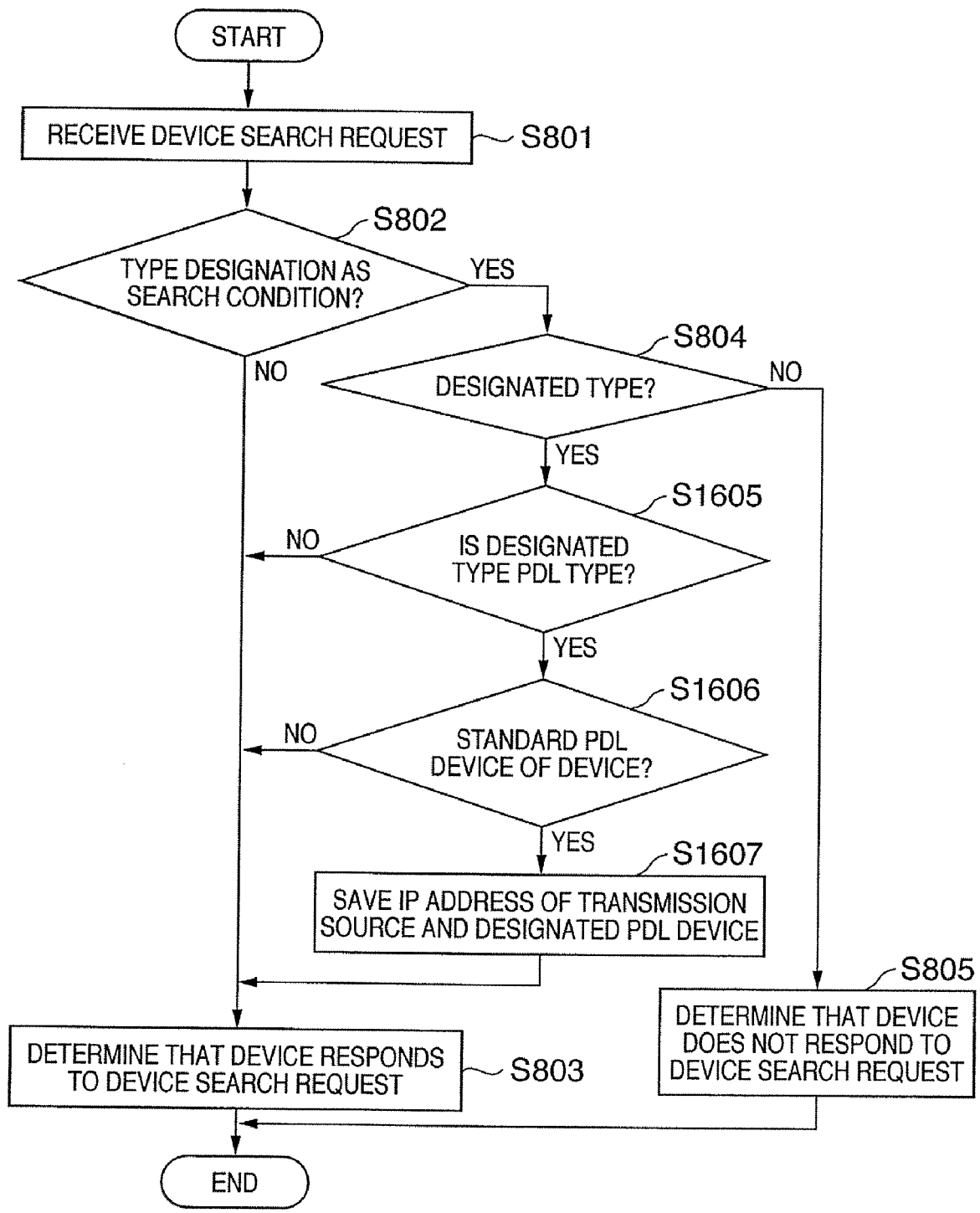
FIG. 16 is a flowchart showing determination processing according to the second embodiment of the present invention.

FIG. 16 is a flowchart showing determination processing according to the second embodiment of the present invention.

The same step numbers as in FIG. 8 of the first embodiment denote the same steps in FIG. 16, and a detailed description thereof will be omitted.

If it is determined in step S804 that a type is designated (YES in step S804), the process advances to step S1605 to determine whether the designated type is a PDL type. If the designated type is not a PDL type (NO in step S1605), the process advances to step S803. If the designated type is a PDL type (YES in step S1605), the process advances to step S1606 to determine whether the designated PDL device is the standard PDL device of the device 400.

If the designated PDL device is not the standard PDL device of the device 400 (NO in step S1606), the process advances to step S803. If the designated PDL device is the standard PDL device of the device 400 (YES in step S1606), the process advances to step S1607. In step S1607, a RAM 402 saves, as search log information, the IP address of an information processing apparatus 510 that has transmitted a device search request, and the PDL designated as the search condition. Then, the process advances to step S803.

An example of search log information will be described here with reference to FIG. 17.

FIG. 17 is a view showing an example of search log information according to the second embodiment of the present invention.

The search log information shown in FIG. 17 manages the names of PDL devices designated by device search requests in correspondence with pieces of address information (IP addresses) of information processing apparatuses (host computers) that have issued these requests. That is, the search log information manages information representing the correspondence between the names of PDL devices designated by device search requests and pieces of address information of information processing apparatuses which have issued these requests.

Especially FIG. 17 indicates that device search requests each of which designates "PDL1" as the search condition are received from information processing apparatuses with IP addresses "192.168.0.2" and "192.168.0.3".

Generation processing of causing the device to generate a service list contained in device information in step S604 of the sequence shown in FIG. 6 will be described next with reference to FIG. 18.

Figure 18:
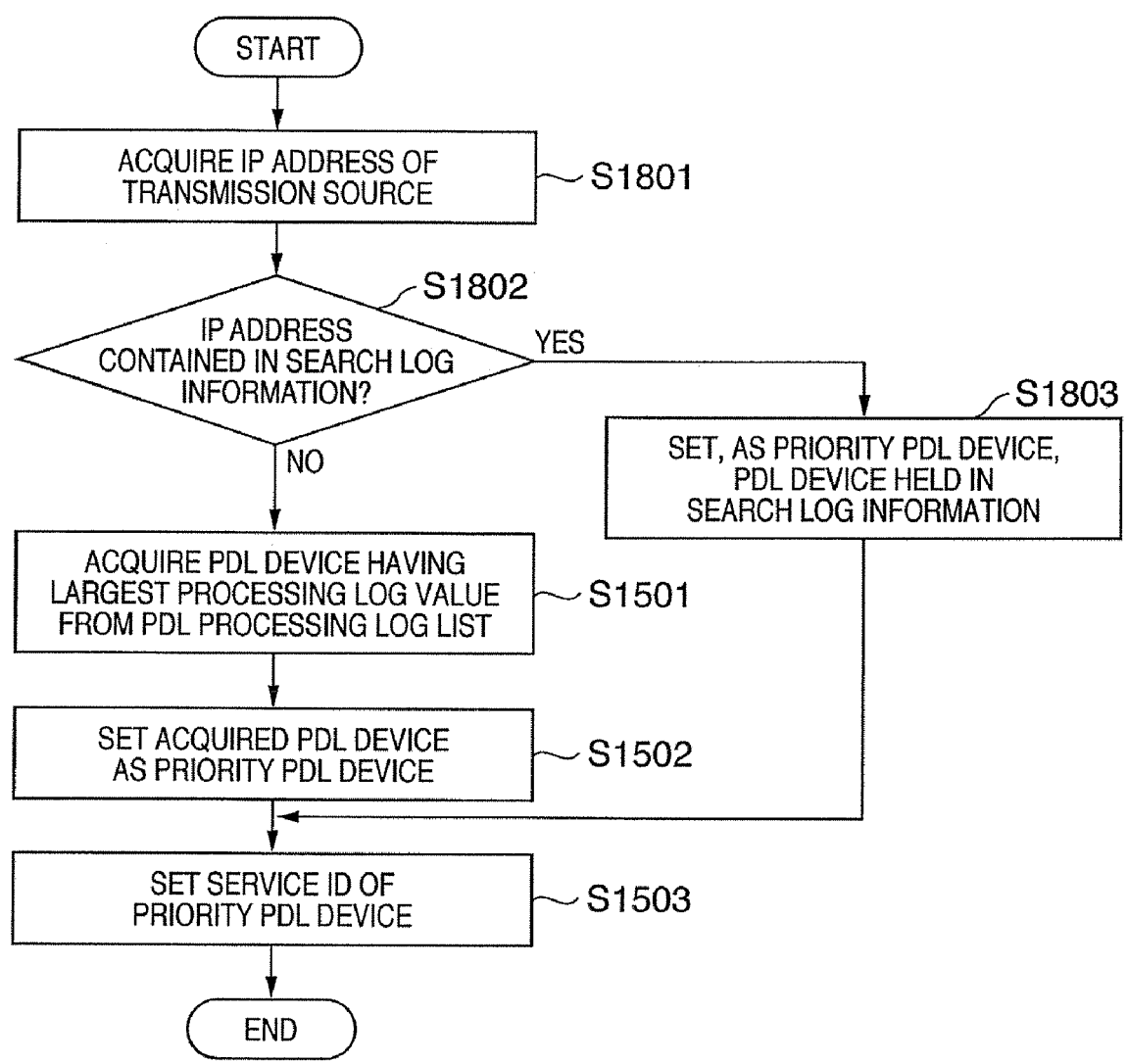
FIG. 18 is a flowchart showing generation processing according to the second embodiment of the present invention.

FIG. 18 is a flowchart showing generation processing according to the second embodiment of the present invention.

The same step numbers as in FIG. 15 of the first embodiment denote the same steps in FIG. 18, and a detailed description thereof will be omitted.

Upon receiving a device information request from an information processing apparatus 510, the device 400 acquires the IP address of the information processing apparatus of the transmission source from the received device information request in step S1801. It is determined in step S1802 whether the IP address acquired in step S1801 is contained in the search log information saved in the RAM 402. If the IP address is contained in the search log information (YES in step S1802), the process advances to step S1803 to set, as a priority PDL device, the PDL device corresponding to the IP address of the information processing apparatus held in the search log information. Then, the process advances to step S1503.

If the IP address is not contained in the search log information (NO in step S1802), the process advances to step S1501. After the processing in step S1502, the service ID corresponding to the set priority PDL device is acquired from the service name information (FIG. 12) and set as the value of <ServiceID> in the device information in step S1503.

As described above, according to the second embodiment, an image forming apparatus manages processing log information according to the first embodiment and stores search log information. When the image forming apparatus includes, as the standard PDL device, a PDL device designated by a device search request, it stores, as log information, identification information (e.g., an IP address) of information processing apparatuses that has issued the request.

If an information processing apparatus with identification information which matches the stored identification information has issued no device information request, the image forming apparatus automatically selects, on the basis of processing log information, a suitable PDL device to be preferentially used, and notifies the information processing apparatus of device information representing the selection result.

Especially, in the second embodiment, an image forming apparatus automatically selects, on the basis of search log information and processing log information, a PDL device having the largest number of times of use if a PDL device designated by a device information request has never been used in the past. The image forming apparatus notifies an information processing apparatus of device information representing the selection result. Hence, the information processing apparatus can install a printer driver corresponding to the PDL device that is most frequently used (expected to be desired by a user at a high probability), thus increasing the convenience for the user.

Third Embodiment

An external storage device 411 of a device 400 has a data storage function of storing and managing data such as a print job so as to print, at another timing, a print job received from an external device and to collectively print a plurality of print jobs. If the user uses this data storage function, he/she can designate a print job stored in the external storage device 411 to print the designated print job.

Also, if the user uses this data storage function, he/she can designate a job, data of which is to be stored, from an external device and issue a data storage instruction, thus storing the job in the external storage device 411.

To attain this function, in the third embodiment, the device 400 refers to the storage states of print jobs stored and managed by its external storage device 411 and identifies the PDL type (format) of a print job, the amount of stored data of which is largest. On the basis of the identification result, the device 400 sets a priority PDL device. This arrangement will be described.

Especially, according to the arrangement of the third embodiment, an information processing apparatus can install a printer driver corresponding to a PDL device expected to be most frequently used at a high probability in the network environment provided with the device.

A RAM 402 stores and manages the storage states of print jobs by generating a storage log list indicating the number of times of storage of PDL type-specific data of each print job stored and managed by the external storage device 411.

Data storage processing executed by the device according to the arrangement of the third embodiment will be described with reference to FIG. 19.

Figure 19:
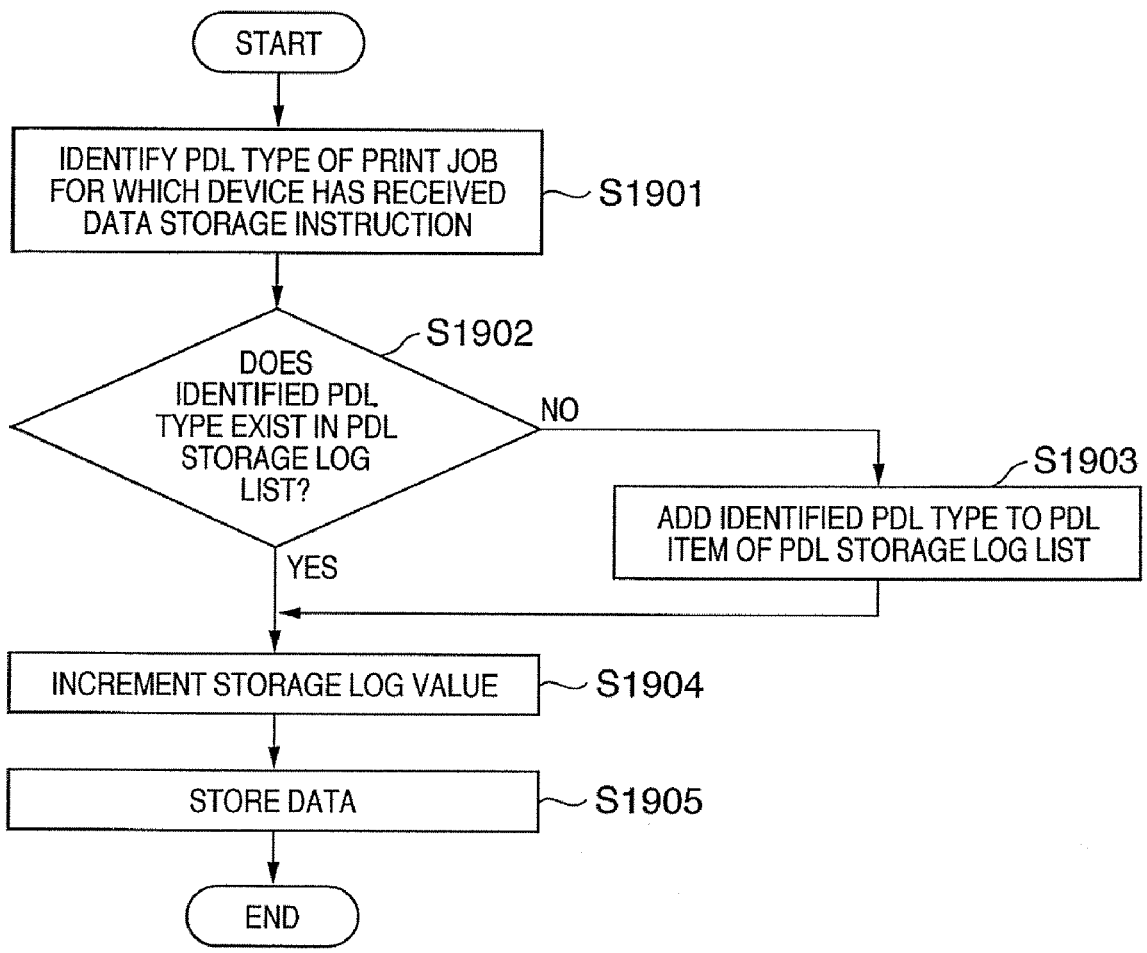
FIG. 19 is a flowchart showing data storage processing according to the third embodiment of the present invention.

FIG. 19 is a flowchart showing data storage processing according to the third embodiment of the present invention.

In the third embodiment, the device generates/updates the above-described storage log list in the data storage processing shown in FIG. 19. The storage log list has, e.g., the arrangement shown in FIG. 20 to manage PDL device (PDL item)-specific storage log values each representing the number of times of data storage of a print job by the corresponding PDL device of the device 400.

In step S1901, the device 400 identifies the PDL type (format) of a print job for which the device 400 has received a data storage instruction. It is determined in step S1902 whether the identified PDL type exists in the storage log list. If no identified PDL type exists (NO in step S1902), the process advances to step S1903 to add the identified PDL type to the PDL item of the storage log list.

If the identified PDL type exists (YES in step S1902), the process advances to step S1904 to increment the storage log value (number of times of data storage) corresponding to the identified PDL type in the storage log list. This makes it possible to manage the storage log value (number of times of data storage) corresponding to the PDL type of the print job stored in the external storage device 411 of the device 400. In step S1905, the device stores data of the print job for which the device 400 has received the data storage instruction.

Generation processing of causing the device to generate a service list contained in device information in step S604 of the sequence shown in FIG. 6 will be described next with reference to FIG. 21.

Figure 21:
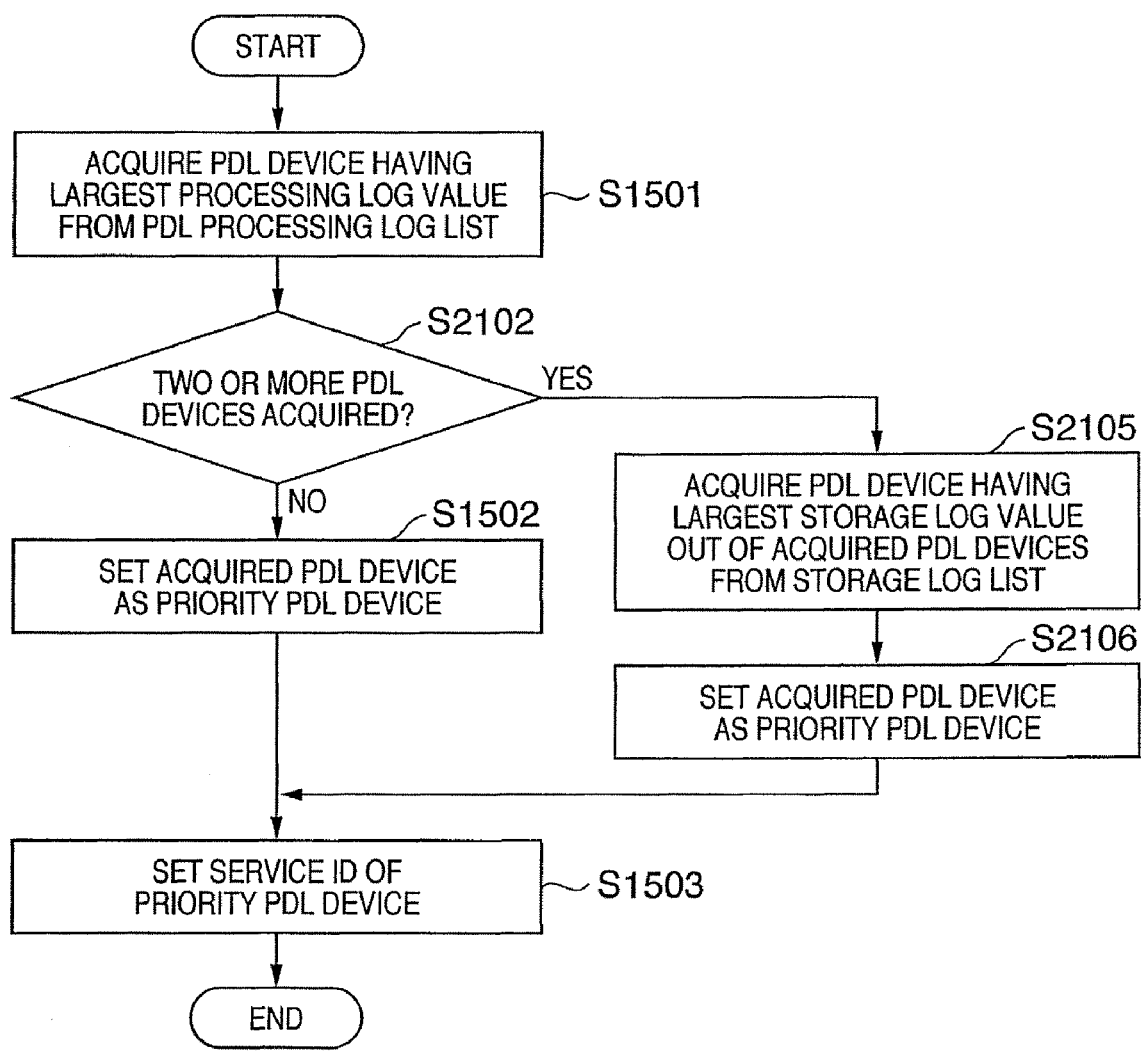
FIG. 21 is a flowchart showing generation processing according to the third embodiment of the present invention.

FIG. 21 is a flowchart showing generation processing according to the third embodiment of the present invention.

The same step numbers as in FIG. 15 of the first embodiment denote the same steps in FIG. 21, and a detailed description thereof will be omitted.

After the processing in step S1501, it is determined in step S2102 whether the device has acquired two or more PDL devices. A case wherein the device has acquired two or more PDL devices indicates that the device has acquired two or more PDL devices equal in the number of times of processing of a print job.

If the device has not acquired two or more PDL devices (NO in step S2102), it executes processing operations in steps S1502 and S1503. With this processing, the device acquires the service ID corresponding to the set priority PDL from the service name information shown in FIG. 12 to set it as the value of <ServiceID>.

If the device has acquired two or more PDL devices (YES in step S2102), the process advances to step S2105 to acquire a PDL device having the largest storage log value (number of times of data storage) out of the PDL devices acquired in step S2101 from the storage log list (FIG. 20).

If a plurality of PDL devices have the largest storage log value, for example, the device may set the priority order of the PDL devices in advance to acquire one of them on the basis of the priority order. Alternatively, the device may acquire all the PDL devices.

In step S2106, the device sets the PDL device acquired in step S2105 as a priority PDL device. Then, the device executes processing in step S1503. With this processing, the device acquires the service ID corresponding to the set priority PDL from the service name information shown in FIG. 12 to set it as the value of <ServiceID>.

As described above, according to the third embodiment, an image forming apparatus manages processing log information according to the first embodiment, and stores storage log information of the PDL type of a print job upon receiving a data storage instruction of that print job.

On the basis of the processing log information and storage log information, the image forming apparatus automatically selects a suitable PDL device to be preferentially used, and notifies an information processing apparatus of device information representing the selection result.

Especially, in the third embodiment, an image forming apparatus automatically selects a PDL device that is most frequently used and stores data in the largest number of times. The image forming apparatus notifies an information processing apparatus of device information representing the selection result. Hence, the information processing apparatus can install a printer driver corresponding to a PDL device expected to be used at a high probability, thus increasing the convenience for the user.

A device which executes processing generates various types of log information (processing log information, search log information, and storage log information) associated with PDL devices described in the first to third embodiments. However, the present invention is not limited to this. For example, when executing print processing through a server apparatus which is provided on the network and controls printing associated with an image forming apparatus, the image forming apparatus may practice the above-described various embodiments using various types of log information in the server apparatus. Alternatively, a server apparatus, if any, may manage various types of log information generated by the device.

A device generates device information on the basis of processing log information in the first embodiment, processing log information and search log information in the second embodiment, and processing log information and storage log information in the third embodiment. However, the present invention is not limited to this. The device can generate device information by arbitrarily combining these types of log information. For example, the device may generate device information on the basis of search log information and storage log information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-255619, filed Sep. 2, 2005, which is hereby incorporated by reference herein in its entirety.

What is claimed is:

1. An image forming apparatus connected to a network and communicable with an information processing apparatus on the network, the image forming apparatus comprising:
a plurality of image forming means each for processing one of a plurality of different Page Description Languages (PDLs);
display means for displaying a screen for setting to validate an automatic PDL selection processing as a Plug and Play setting;
reception means for receiving a search request from the information processing apparatus, wherein said search request is a probe request which is described by XML and includes type information of a PDL;
response means for interpreting the type information included in said search request and responding only when the image forming apparatus includes the image forming means corresponding to the type information;
log storage means for storing, as log information, search log information representing the information processing apparatus that transmitted said search request and the type information;
decision means for deciding, as priority image forming means, the image forming means corresponding to the type information included in said search request from said plurality of image forming means if the information processing apparatus that transmitted the information request exists in the search log information, and (ii) deciding, as priority image forming means, the most-used image forming means in the image forming apparatus from said plurality of image forming means if the information processing apparatus that transmitted said information request does not exist in the search log information; and
transmission means for transmitting, in response to said information request transmitted from the information processing apparatus, identification information containing an identifier of the priority image forming means decided by said decision means,
wherein, when the automatic PDL selection processing is validated, said decision means decides the priority image forming means.

2. The apparatus according to claim 1,
wherein, when the automatic PDL selection processing is not validated, said displaying means displays a screen to allow a user to select a desired image forming means.

3. An image forming system comprising:
an image forming apparatus; and
an information processing apparatus connected to the image forming apparatus through a network,
wherein the image forming apparatus comprises:
a plurality of image forming means each for processing one of a plurality of different Page Description Languages (PDLs);
display means for displaying a screen for setting to validate an automatic PDL selection processing as a Plug and Play setting;
reception means for receiving a search request from the information processing apparatus, wherein said search request is a probe request which is described by XML and includes type information of a PDL;
response means for interpreting the type information included in said search request and responding only when the image forming apparatus includes the image forming means corresponding to the type information;
log storage means for storing, as log information, search log information representing the information processing apparatus that transmitted said search request and the type information;
decision means for (i) deciding, as priority image forming means, the image forming means corresponding to the type information included in said search request from said plurality of image forming means if the information processing apparatus that transmitted the information request exists in the search log information, and (ii) deciding, as priority image forming means, the most-used image forming means in the image forming apparatus from said plurality of image forming means if the information processing apparatus that transmitted said information request does not exist in the search log information; and
transmission means for transmitting, in response to said information request transmitted from the information processing apparatus, identification information containing an identifier of the priority image forming means decided by said decision means,
wherein, when the automatic PDL selection processing is validated, said decision means decides the priority image forming means, and wherein the information processing apparatus comprises:
reception means for receiving the identification information from the image forming apparatus; and
installation means for installing, on the basis of the identification information received by said reception means, a device driver to use the image forming apparatus.

4. A control method for an image forming apparatus connected to a network and communicable with an information processing apparatus on the network, the image forming apparatus having a plurality of image forming means each for processing one of a plurality of different Page Description Languages (PDLs), the method comprising:
a displaying step of displaying a screen for setting to validate an automatic PDL selection processing as a Plug and Play setting;
a receiving step of receiving a search request from the information processing apparatus, wherein said search request is a probe request which is described by XML and includes type information of a PDL;
a response step of interpreting the type information included in said search request and responding only when the image forming apparatus includes the image forming means corresponding to the type information;
a log storing step of storing, in a storage medium, as log information, search log information representing the information processing apparatus that transmitted said search request and the type information;
a decision step of (i) deciding, as priority image forming means, the image forming means corresponding to the type information included in said search request from said plurality of image forming means if the information processing apparatus that transmitted the information request exists in the search log information, and (ii) deciding, as priority image forming means, the most-used image forming means in the image forming apparatus from said plurality of image forming means if the information processing apparatus that transmitted said information request does not exist in the search log information; and
a transmission step of transmitting, in response to said information request transmitted from the information processing apparatus, identification information containing an identifier of the priority image forming means decided in the decision step,
wherein, when the automatic PDL selection processing is validated, said decision step decides the priority image forming means.

5. A non-transitory computer-readable memory storing a computer program executable by a computer to execute a control method for an image forming apparatus connected to a network and communicable with an information processing apparatus on the network, the image forming apparatus having a plurality of image forming means each for processing one of a plurality of different Page Description Languages (PDLs), the method comprising:
a displaying step of displaying a screen for setting to validate an automatic PDL selection processing as a Plug and Play setting;
a receiving step of receiving a search request from the information processing apparatus, wherein said search request is a probe request which is described by XML and includes type information of a PDL;
a response step of interpreting the type information included in said search request and responding only when the image forming apparatus includes the image forming means corresponding to the type information;
a log storing step of storing, in a storage medium, as log information, search log information representing the information processing apparatus that transmitted said search request and the type information;
a decision step of (i) deciding, as priority image forming means, the image forming means corresponding to the type information included in said search request from said plurality of image forming means if the information processing apparatus that transmitted the information request exists in the search log information, and (ii) deciding, as priority image forming means, the most-used image forming means in the image forming apparatus from said plurality of image forming means if the information processing apparatus that transmitted said information request does not exist in the search log information; and
a transmission step of transmitting, in response to said information request transmitted from the information processing apparatus, identification information containing an identifier of the priority image forming means decided in the decision step,
wherein, when the automatic PDL selection processing is validated, said decision step decides the priority image forming means.

* * * * *